(12) United States Patent
Janson et al.

(10) Patent No.: US 7,694,773 B2
(45) Date of Patent: Apr. 13, 2010

(54) HYBRID ELECTRIC MOTOR VEHICLE AND A FINAL DRIVE UNIT THEREFOR

(75) Inventors: David Allen Janson, Plymouth, MI (US); Lawrence Lodge, White Lake, MI (US)

(73) Assignee: Land Rover (GB)

( * ) Notice: Subject to any disclaimer, the term of this patent is extended or adjusted under 35 U.S.C. 154(b) by 552 days.

(21) Appl. No.: 11/697,076

(22) Filed: Apr. 5, 2007

(65) Prior Publication Data

US 2008/0245595 A1 Oct. 9, 2008

(51) Int. Cl.
*B60K 17/356* (2006.01)
*B60K 6/50* (2007.10)
(52) U.S. Cl. ................... 180/243; 180/65.235
(58) Field of Classification Search .......... 180/63, 180/297, 65.21, 65.22, 65.225, 65.23, 65.235, 180/68.2, 242, 243; 903/904, 906, 915
See application file for complete search history.

(56) References Cited

U.S. PATENT DOCUMENTS

| | | | | | |
|---|---|---|---|---|---|
| 1,083,730 | A | * | 1/1914 | Collischonn | 290/14 |
| 4,605,087 | A | * | 8/1986 | Ashauer et al. | 180/248 |
| 4,938,306 | A | * | 7/1990 | Sumiyoshi et al. | 180/233 |
| 5,370,588 | A | * | 12/1994 | Sawase et al. | 475/84 |
| 5,489,001 | A | * | 2/1996 | Yang | 180/65.21 |
| 5,685,389 | A | * | 11/1997 | Muller | 180/249 |
| 5,713,425 | A | * | 2/1998 | Buschhaus et al. | 180/65.25 |
| 6,098,737 | A | * | 8/2000 | Aoki | 180/242 |
| 6,886,647 | B1 | * | 5/2005 | Gotta | 180/65.1 |
| 7,175,557 | B2 | * | 2/2007 | Kirkwood et al. | 475/150 |
| 7,211,019 | B2 | * | 5/2007 | Kirkwood et al. | 475/205 |

(Continued)

FOREIGN PATENT DOCUMENTS

JP 2000013922 A * 1/2000

(Continued)

*Primary Examiner*—Paul N Dickson
*Assistant Examiner*—Chiedu A Chibogu
(74) *Attorney, Agent, or Firm*—Brooks Kushman P.C.

(57) ABSTRACT

In a motor vehicle having an internal combustion engine driving a front final drive unit connected to a pair of front wheels and a pair of rear wheels 21 driven through the rear final drive unit 18 by a longitudinal propshaft 19, the rear final drive unit 18 houses a transversely arranged electric motor/generator 35. The motor/generator 35 has a hollow rotor 36 which is connected to a spur input gear 64 of a layshaft reduction gear train 65 through a hollow shaft 37. This input gear 64 meshes with a large diameter spur gear 66 fixed on a layshaft 67 which also has a small diameter spur gear 68 fixed on it. The small diameter spur gear 68 meshes with a large diameter driving gear 69 fast with a differential 28 which drives the rear wheels by means of the drive shafts 22, one of which extends concentrically through the rotor 36 and the hollow shaft 37. A control clutch 33 controllably couples the propshaft 19 to an input shaft 32 which drives a final drive bevel pinion 31 which meshes with a crownwheel 27 fast with the large diameter spur gear 66. The layshaft 67 provides a reduction ratio between the motor/generator 35 and the final drive pinion 31 and the differential 28 as well as providing a reduction ratio between the input shaft 32 and the differential 28.

6 Claims, 3 Drawing Sheets

U.S. PATENT DOCUMENTS 7,455,145 B2 * 11/2008 Irikura et al. ............... 180/242
2004/0011576 A1 * 1/2004 Taniguchi et al. .......... 180/65.2
2004/0050597 A1 * 3/2004 Ai et al. ..................... 180/65.2
2004/0079568 A1 * 4/2004 Bell et al. ................... 180/65.6

FOREIGN PATENT DOCUMENTS

JP        2007131107 A   *  5/2007
WO    WO 2007013642 A1  *  2/2007

* cited by examiner

HYBRID ELECTRIC MOTOR VEHICLE AND A FINAL DRIVE UNIT THEREFOR

The invention relates to hybrid electric motor vehicles, particularly but not exclusively of the kind where an internal combustion (IC) engine provides power to a four wheel drive transmission which has an electric motor/generator in the drive to one pair of wheels.

It is known from EP0584090 to provide a hybrid electric motor vehicle in which a motor/generator is mounted on the nose of a rear final drive unit where a propshaft connects an engine and transmission unit to the rear final drive unit, the motor/generator providing additional drive torque or braking torque as required. It is also known from U.S. Pat. No. 5,443,130 to provide an electric motor drive in which an electric traction motor is arranged transversely on a final drive unit, the motor having a hollow rotor which drives a differential through an epicyclic reduction gear, the differential driving one of the wheels through a shaft which extends concentrically through the rotor.

The present invention has an object of providing a hybrid electric motor vehicle in which a motor/generator unit is mounted in a final drive unit and wherein the final drive unit with the motor/generator unit has a reduced number of component parts.

According to one aspect of the invention there is provided a hybrid electric motor vehicle having an internal combustion engine, a transmission to transmit power from the engine to a front pair of wheels through a front final drive unit and to a rear pair of wheels through a rear final drive unit and an electric motor/generator in the drive to one of said pairs of wheels, the motor/generator being arranged in one of the final drive units and comprising a casing, a stator and a rotor, the stator being fast with the casing and the rotor driving said one pair of wheels through a reduction gear and a differential and the motor/generator being arranged transversely in said one final drive unit, the rotor of the motor/generator being hollow such that a drive shaft connecting the differential to one of said one pair of wheels extends concentrically through the rotor, wherein the reduction gear comprises a layshaft reduction gear train including a spur input gear driven by the motor/generator, a large diameter spur gear and a small diameter spur gear fixed on a layshaft and a large diameter driving gear fast with the differential, the large diameter spur gear meshing with the input gear and the small diameter spur gear meshing with the driving gear.

The invention also provides, according to another aspect thereof, a final drive unit for a hybrid electric motor vehicle having an internal combustion engine, a transmission to transmit power from the engine to a front pair of wheels through a front final drive unit and to a rear pair of wheels through a rear final drive unit and an electric motor/generator in the drive to one of said pairs of wheels, the motor/generator being arranged in one of the final drive units, wherein said one final drive unit comprises a casing, a stator and a rotor, the stator being fast with the casing and the rotor arranged to drive said one pair of wheels through a reduction gear and a differential, the motor/generator being arranged transversely in said one final drive unit and the rotor of the motor/generator being hollow such that a drive shaft which in use connects the differential to one of said one pair of wheels extends concentrically through the rotor, wherein the reduction gear comprises a layshaft reduction gear train including a spur input gear driven by the motor/generator, a large diameter spur gear and a small diameter spur gear fixed on a layshaft and a large diameter driving gear fast with the differential, the large diameter spur gear meshing with the input gear and the small diameter spur gear meshing with the driving gear.

Said one final drive unit may include an input shaft arranged longitudinally in the vehicle to transmit power, typically via a propshaft, from the transmission to the differential, the input shaft having a final drive bevel pinion which meshes with a crownwheel fast with the large diameter spur gear. Preferably, the layshaft spur gears are adjacent each other with the crown wheel facing away from the small diameter spur gear towards the final drive bevel pinion.

The invention will now be described by way of example and with reference to the accompanying drawings, in which:—

Figure 1:
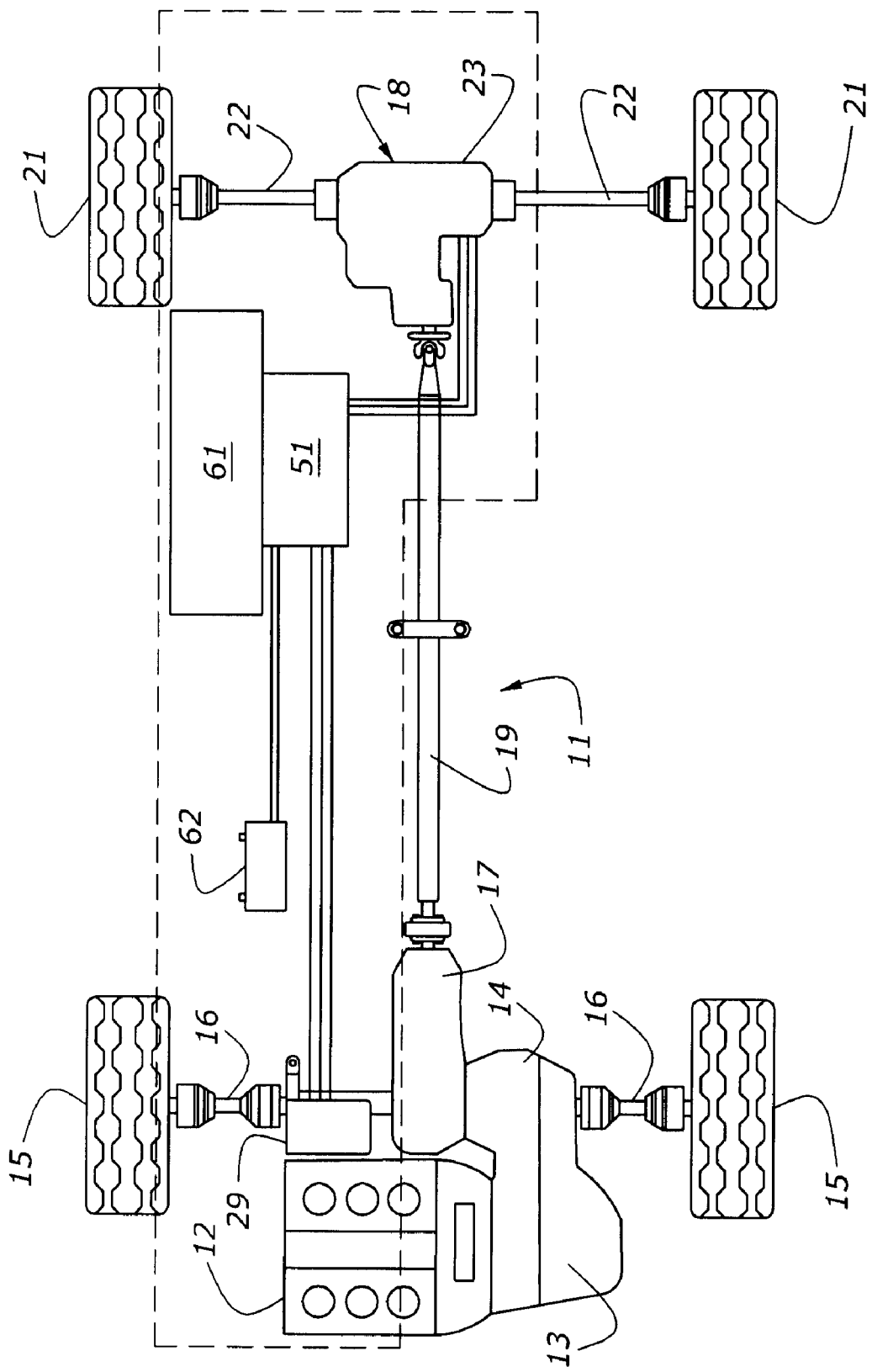
FIG. 1 is a schematic diagram of one example of a hybrid electric motor vehicle according to the invention.
Figure 2:
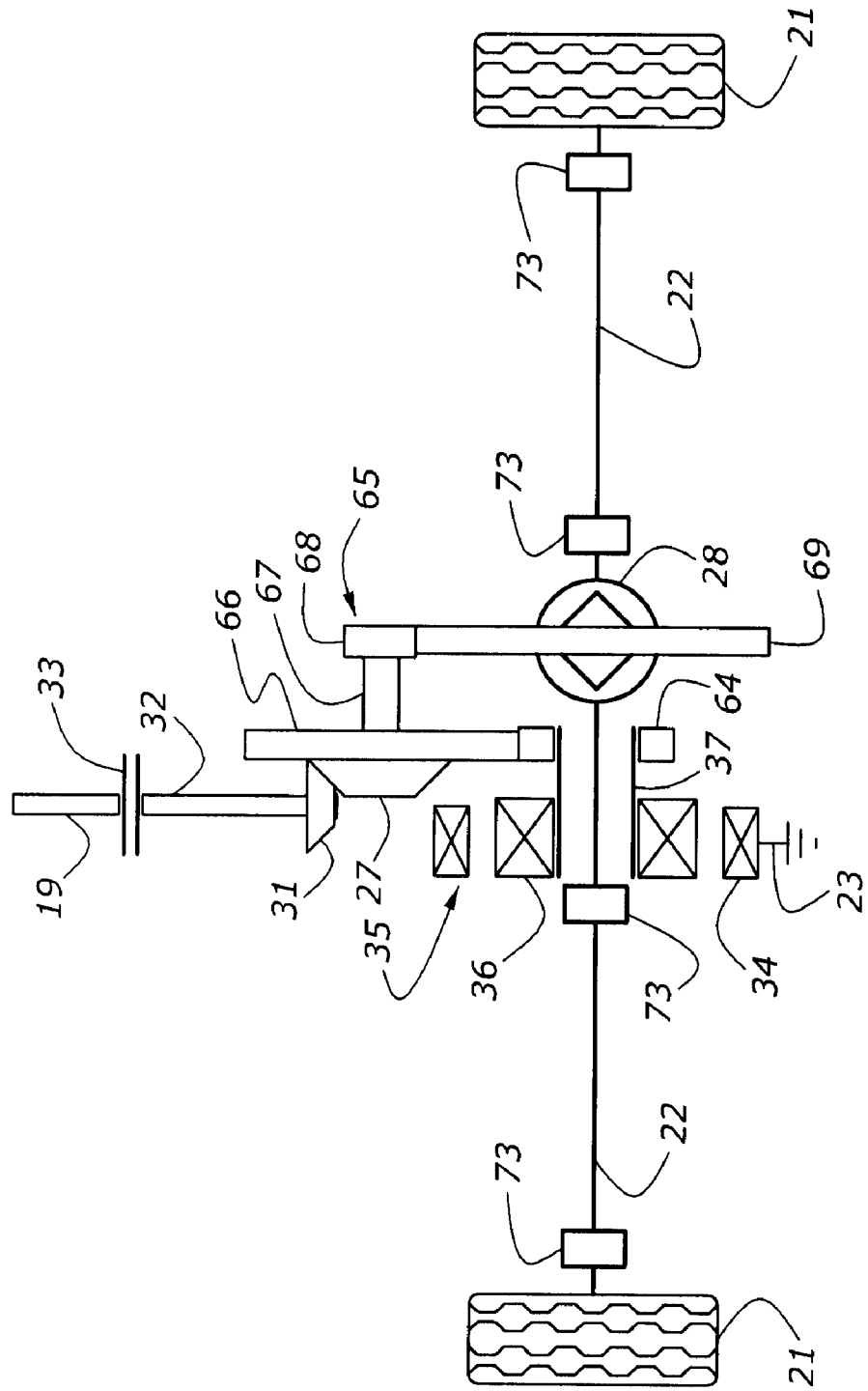
FIG. 2 is a schematic diagram of a motor/generator assembly mounted in a final drive unit shown in FIG. 1.

Referring to FIGS. 1 and 2, a hybrid electric motor vehicle 11 has an IC engine 12 driving a transmission 13 (which may be a manual gearbox, or any type of automatic transmission) which in turn drives a front final drive unit 14 connected to a pair of front wheels 15 by front driveshafts 16. The front final drive unit 14 also drives a rear drive take-off unit 17 which is connected to a rear final drive unit 18 by a longitudinal propshaft 19. The rear final drive unit 18 is connected to a pair of rear wheels 21 by rear driveshafts 22. The rear final drive unit 18 has a casing 23 which carries the inboard ends of the rear driveshafts 22.

As described so far, the vehicle 11 is of a generally known type. However, as seen in FIG. 2, a motor/generator 35 is arranged transversely in the final drive unit 18. The motor/generator 35 has stator 34 and a rotor 36. The stator 34 is fastened with the casing 23. The rotor 36 is a hollow rotor 36 which is connected to a spur input gear 64 of a layshaft reduction gear train 65 through a hollow shaft 37. This input gear 64 meshes with a large diameter spur gear 66 fixed on a layshaft 67 which also has a small diameter spur gear 68 fixed on it. The small diameter spur gear 68 meshes with a large diameter driving gear 69 fast with a differential 28 which drives the rear wheels by means of the drive shafts 22, one of which extends concentrically through the rotor 36 and the hollow shaft 37.

A control clutch 33 controllably couples the propshaft 19 to an input shaft 32 which is fast with a final drive bevel pinion 31 which meshes with a crownwheel 27 fast with the large diameter spur gear 66.

The motor/generator 35 is controlled by an electronic control unit (ECU) 51. Power is generated by the motor/generator 35 and by another motor/generator, conveniently referred to as the integrated starter generator 29, driven by (or driving) the engine 12. Both the motor/generator 35 and the integrated starter generator 29 draw current from or supply current to a traction battery 61 and to an auxiliaries battery 62. The traction battery 61 would ordinarily be a high voltage unit while the auxiliaries battery 62 would be 12V for the supply & control of the normal vehicle electrical systems.

In normal on-road use of the vehicle 11 the engine 12 can drive the front wheels 15 through the transmission 13, the front final drive unit 14 and the front driveshafts 16 while also driving the rear wheels 21 through the rear take-off unit 17, the propshaft 19, the rear final drive unit 18 and the rear driveshafts 22. The rear take-off unit 17 is driven in a direct ratio of the drive to the front wheels 15, the control clutch 33 allowing drive torque to the rear wheels 21 as required to maintain an appropriate torque split between the front and rear wheels 15, 21. Under gentle low speed driving conditions, the electric motor generator 35 can be used to drive the vehicle with the engine 12 stopped, in which case the control clutch 33 would be disengaged and drive would be to the rear wheels 21 only through the layshaft reduction gear train 65, i.e., the small diameter spur gear 68 drives the large diameter spur gear 66 through the layshaft 67 which in turn drives the differential 28 through the small diameter spur gear 68 and the large diameter driving gear 69. Under more severe low speed driving conditions, such as pulling away from junctions or driving off-road, the motor generator 35 can be used to supplement the power supplied by the engine 12.

For higher road speeds, particularly out of town driving, the engine 12 would drive as described above with the integrated starter generator 29 and, where needed, the electric motor generator 35 supplying current to the batteries 61 and 62.

The layshaft reduction gear train 65 provides a reduction ratio between the motor/generator 35 and the final drive pinion 31 and the differential 28 as well as providing a reduction ratio between the input shaft 32 and the differential 28. Thus the layshaft 67 performs the dual task of providing reduction gearing for both the electric motor/generator 35 and the mechanical drive from the engine 12. Compared with a conventional four wheel drive vehicle driven by the IC engine 12 alone and with the same basic drive line there is a minimal additional parts count and additional frictional/windage losses from the electric motor/generator 35 are also minimised.

Figure 4:
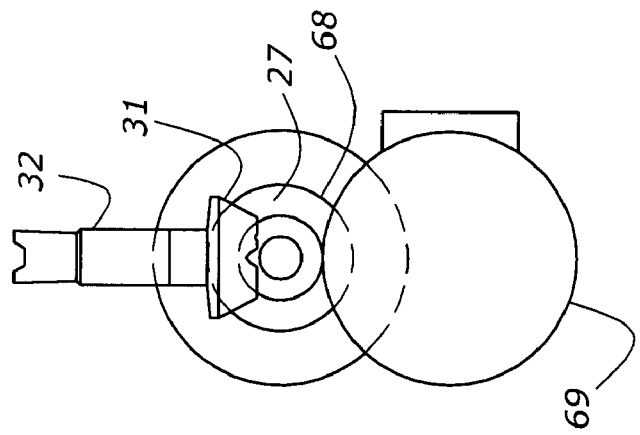
FIG. 4 is a schematic diagram showing outlines of gear elements shown in FIG. 3.
Figure 3:
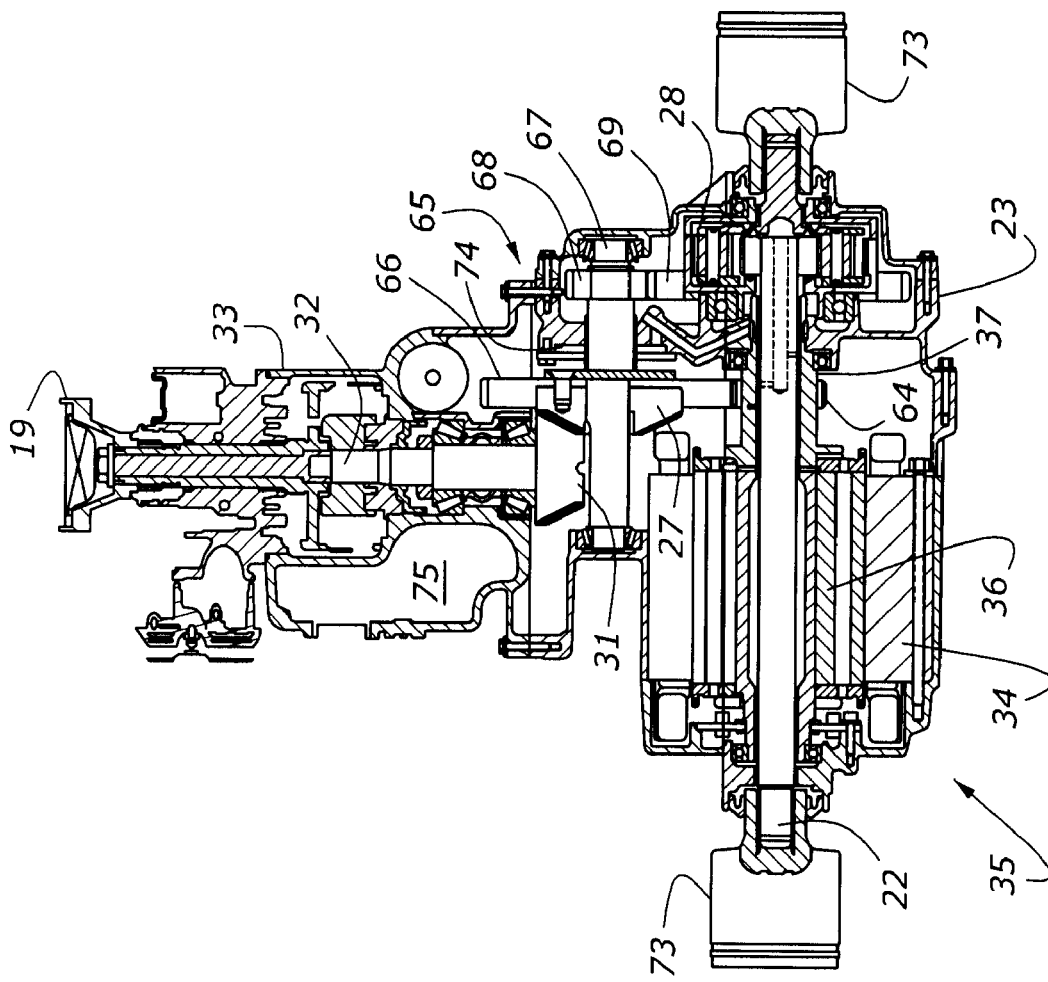
FIG. 3 is a schematic sectional drawing of an example of a motor/generator assembly and a final drive unit based on the diagram shown in FIG. 2.

It will be appreciated that the casing 23 supports the various shafts and gear elements and provide lubrication and cooling where appropriate. The drive shafts 22 each comprise an inner shaft extending inside the casing 23 and an outer shaft outside the casing 23 extending towards the respective wheel 21, universal joints 73 connecting the inner and outer shafts and the outer shaft and the wheel. In the detail design of these arrangements, as exemplified by FIGS. 3 and 4, the input shaft 32 is arranged on a substantially central longitudinal axis of the vehicle and the casing 23 is arranged to be packaged as compactly and centrally as reasonably possible. This allows the input shaft 32 to be aligned with the propshaft 19 which, in a conventional automobile or SUV, has to be located centrally in a floor tunnel between seats provided for the driver and passengers. This compactness is helped by the use of a spur-type differential 28 in which an annulus gear is fast with the large diameter driving gear 69. A carrier which is fast with the adjacent inboard universal joint 73 (the right-hand joint as seen in FIG. 3) carries two sets of planet gears, each planet gear of the first set meshing with the gear teeth of the annulus gear and each planet gear of the second set meshing both with a respective planet gear of the first set and with a sun gear fast with the shaft 22 extending through the motor/generator 35 to the other inboard universal joint 73 (the left-hand joint as seen in FIG. 3). The number of gear teeth on the annulus gear is twice the number of gear teeth on the sun gear while the planet gears have equal numbers of gear teeth.

Compactness is also helped by having the layshaft spur gears 66 and 68 adjacent each other with the crown wheel 27 facing away from the small diameter spur gear 68 towards the final drive bevel pinion 31. The layshaft 67 also drives an oil pump 74 having a rotor arranged concentrically around the layshaft, the pup drawing oil from a reservoir 75 to supply it to various bearings for lubrication and to an annular space between the drive shaft 22 and the rotor 36 for cooling purposes.

It will be appreciated that the final drive unit may share common parts with a unit which incorporates the motor/generator 35, the layshaft reduction gear 65 and the differential 28 but omits those parts associated with the mechanical drive from the IC engine 12. Hence the control coupling 33, the input shaft 32, the bevel pinion 31 and the crown wheel 27 would be omitted while allowing the other parts to remain common to both types. This helps to maintain production volumes and reduce inventory if the final drive is for a vehicle of the kind where an IC engine provides drive to front wheels only and the electric motor/generator provides drive to the rear wheels only.

The control clutch 33 may form part of the front drive take-off unit 17 instead of forming part of the rear final drive unit 18. Indeed, the front drive take-off unit 17 may incorporate a centre differential which splits the torque between the front wheels 15 and the rear wheels 21 and in such a case the control clutch 33 may be omitted.

While the vehicle 11 has been described as having the engine 12 towards the front, other layouts may be applicable, e.g., a rear engine and transmission or a front engine arranged longitudinally with a transmission behind it. Hence references to front and rear are used primarily for convenience to describe the relative positions of components.

The invention claimed is

1. A hybrid electric motor vehicle having an internal combustion engine, a transmission to transmit power from the engine to a front pair of wheels through a front final drive unit and to a rear pair of wheels through a rear final drive unit and an electric motor/generator to drive one of said pairs of wheels, the electric motor/generator being arranged in one of the final drive units and comprising a casing, a stator and a rotor, the stator being fastened with the casing and the rotor driving said one pair of wheels through a reduction gearing arrangement and a differential and the electric motor/generator being arranged transversely in said one of the final drive units, the rotor of the electric motor/generator being hollow such that a drive shaft connecting the differential to one of said one pair of wheels extends concentrically through the rotor, wherein the reduction gearing arrangement comprises a layshaft reduction gear train including a spur input gear driven by the electric motor/generator, a large diameter spur gear and a small diameter spur gear fixed on a layshaft and a large diameter driving gear fastened with the differential, the large diameter spur gear meshing with the spur input gear and the small diameter spur gear meshing with the large diameter driving gear.

2. A vehicle according to claim 1 wherein an input shaft is arranged longitudinally in the vehicle to transmit power from the transmission to the differential, the input shaft having a final drive bevel pinion which meshes with a crownwheel fastened with the large diameter spur gear.

3. A vehicle according to claim 1 wherein the large diameter spur gear and the small diameter spur gear are adjacent each other with the crownwheel facing away from the small diameter spur gear towards the final drive bevel pinion.

4. A final drive unit for a hybrid electric motor vehicle having an internal combustion engine, a transmission to transmit power from the engine to a front pair of wheels through a front final drive unit and to a rear pair of wheels through a rear final drive unit and an electric motor/generator to drive one of said pairs of wheels, the electric motor/generator being arranged in one of the final drive units, wherein said one of the final drive unit comprises a casing, a stator and a rotor, the stator being fastened with the casing and the rotor being arranged to drive one of said pairs of wheels through a reduction gearing arrangement and a differential, the electric motor/generator being arranged transversely in said one of the final drive units and the rotor of the electric motor/generator being hollow such that a drive shaft which in use connects the differential to one of said one pair of wheels extends concentrically through the rotor, wherein gearing arrangement a layshaft reduction gear train including a spur input gear driven by the electric motor/generator, a large diameter spur gear and a small diameter spur gear fixed on a layshaft and a large diameter driving gear fastened with the differential, the large diameter spur gear meshing with the spur input gear and the small diameter spur gear meshing with the large diameter driving gear.

5. A final drive unit according to claim 4 further comprising an input shaft which in use is arranged longitudinally in the vehicle to transmit power from the transmission to the differential, the input shaft having a final drive bevel pinion which meshes with a crownwheel fastened with the large diameter spur gear.

6. A final drive unit according to claim 1 wherein the large diameter spur gear and the small diameter spur gear are adjacent each other with the crownwheel facing away from the small diameter spur gear towards the final drive bevel pinion.

* * * * *

UNITED STATES PATENT AND TRADEMARK OFFICE
CERTIFICATE OF CORRECTION

| | | |
|---|---|---|
| PATENT NO. | : 7,694,773 B2 | Page 1 of 1 |
| APPLICATION NO. | : 11/697076 | |
| DATED | : April 13, 2010 | |
| INVENTOR(S) | : David Allen Janson et al. | |

It is certified that error appears in the above-identified patent and that said Letters Patent is hereby corrected as shown below:

Column 5, Line 5, Claim 4:

After "through the rotor, wherein" insert -- reduction --.

Column 5, Line 6, Claim 4:

After "arrangement" insert -- comprises --.

Signed and Sealed this

Thirty-first Day of August, 2010

David J. Kappos
*Director of the United States Patent and Trademark Office*